United States Patent [19]

Akiyama et al.

[11] Patent Number: 5,392,143

[45] Date of Patent: Feb. 21, 1995

[54] LIQUID CRYSTAL DISPLAY HAVING DRAIN AND PIXEL ELECTRODES LINKABLE TO A WIRING LINE HAVING A POTENTIAL

[75] Inventors: Masahiko Akiyama; Yutaka Nakai, both of Tokyo, Japan

[73] Assignee: Kabushiki Kaisha Toshiba, Kawasaki, Japan

[21] Appl. No.: 31,872

[22] Filed: Mar. 16, 1993

Related U.S. Application Data

[63] Continuation-in-part of Ser. No. 596,026, Oct. 11, 1990, abandoned.

[30] Foreign Application Priority Data

Nov. 30, 1989 [JP] Japan .................................. 1-309339
Jun. 17, 1992 [JP] Japan .................................. 4-157624

[51] Int. Cl.⁶ .................................................. G02F 1/1343
[52] U.S. Cl. .................................. 359/59; 359/87; 345/93
[58] Field of Search ................. 350/333, 332; 340/784; 357/23.7; 359/59, 87; 345/93

[56] References Cited

U.S. PATENT DOCUMENTS

| | | | |
|---|---|---|---|
| 4,666,252 | 5/1987 | Yaniv et al. | 350/333 |
| 4,751,197 | 6/1988 | Wills | 357/71 |
| 4,761,058 | 8/1988 | Okubo et al. | 350/331 T |
| 4,902,638 | 2/1990 | Muto | 350/333 X |
| 4,996,575 | 2/1991 | Ipri et al. | 357/23.7 |
| 5,017,983 | 5/1991 | Wu | 357/23.7 |
| 5,042,916 | 8/1991 | Ukai et al. | 359/89 X |
| 5,062,690 | 11/1991 | Whetten | 359/89 X |
| 5,076,666 | 12/1991 | Katayama et al. | 359/87 |
| 5,121,236 | 6/1992 | Ukai et al. | 359/59 |
| 5,337,173 | 8/1994 | Atsumi et al. | 359/59 |

FOREIGN PATENT DOCUMENTS

| | | |
|---|---|---|
| 0200138 | 12/1986 | European Pat. Off. . |
| 0372898 | 6/1990 | European Pat. Off. . |
| 61-213880 | 9/1986 | Japan . |
| 62-22455 | 1/1987 | Japan . |
| 62-23086 | 1/1987 | Japan . |
| 3-239230 | 10/1991 | Japan .................. 359/59 |
| 4-16930 | 1/1992 | Japan .................. 359/59 |
| 4-265943 | 9/1992 | Japan .................. 359/59 |
| 4-265946 | 9/1992 | Japan .................. 359/59 |
| 4-331923 | 11/1992 | Japan .................. 359/59 |

OTHER PUBLICATIONS

Conference Record of the 1988 International Display Research Conference, Oct. 4–6, 1988, pp. 152–154, IEEE, Z. Yaniv, et al., "A 640×480 Pixel Computer Display Using Pin Diodes with Device Redundancy".
Patent Abstracts of Japan, vol. 8, No. 245, (P-312)[1682], Nov. 10, 1984, & JP-A-59 119 322, Jul. 10, 1984, K. Kinji, et al., "Active Matrix Liquid-Crystal Display Device".
Proceedings of the 6th Inter. Display Research Conference (Japan Display '86) M. Takeda et al. Sep. 30, 1986 p. 204.
1989 SID International Symposium Digest of Technical Papers. Y. Matsueda et al. May 1989, p. 238.
1988 SID International Symposium, Digest of Technical Papers. D. E. Castleberry et al. May 24, 1988, p. 232.

Primary Examiner—William L. Sikes
Assistant Examiner—Ron Trice
Attorney, Agent, or Firm—Oblon, Spivak, McClelland, Maier & Neustadt

[57] ABSTRACT

A liquid crystal display provides redundant circuits to ensure reliable operation of all pixels of a display and includes a substrate, a scanning line formed on the substrate, a pixel electrode formed on the substrate, a first switching element which is switched on and off in accordance with a potential level of the scanning line, a second auxiliary switching element which is initially electrically isolated from the pixel electrode by a switchable link.

1 Claim, 14 Drawing Sheets

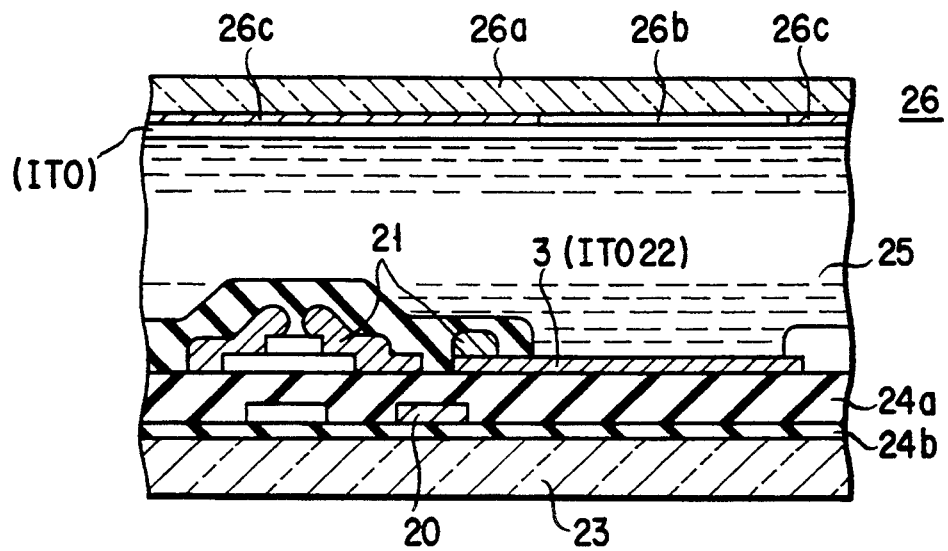
F I G. 4B
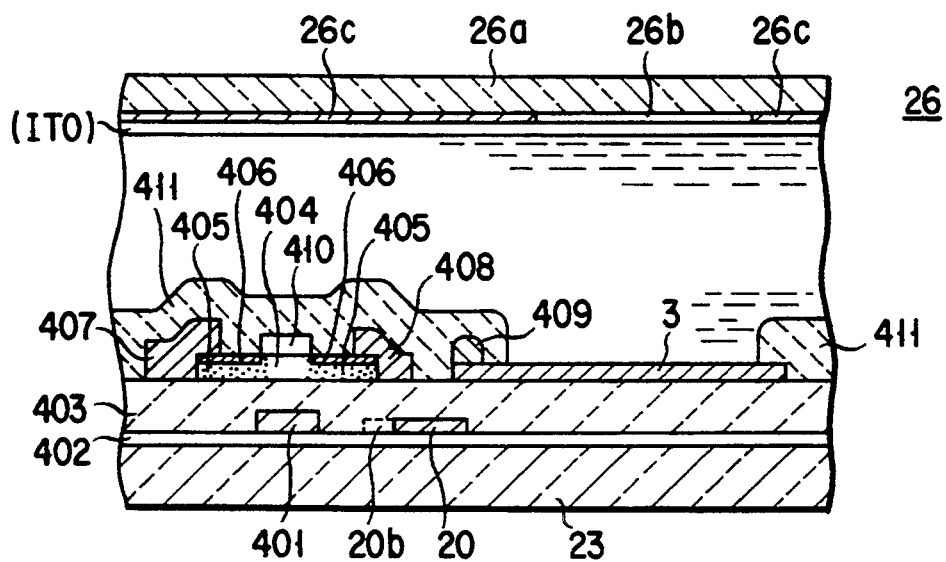
F I G. 4C

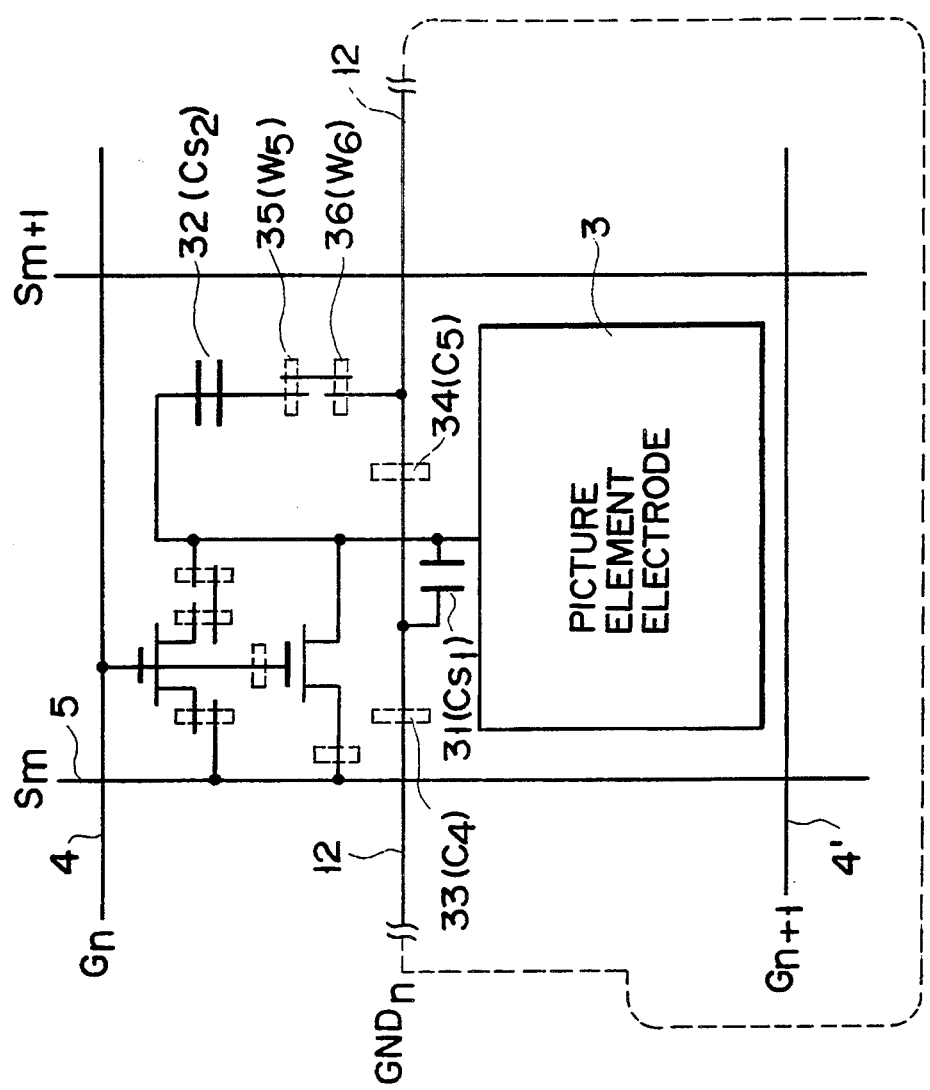
F I G. 5

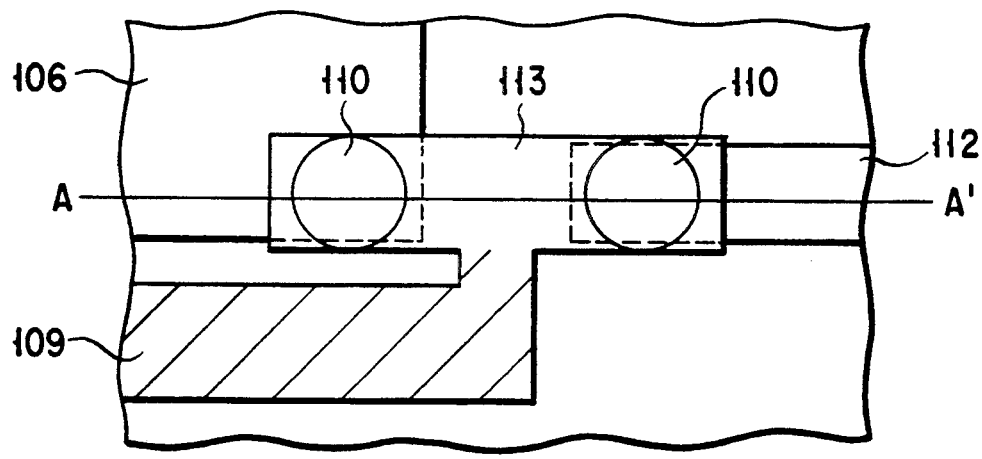
F I G. 12
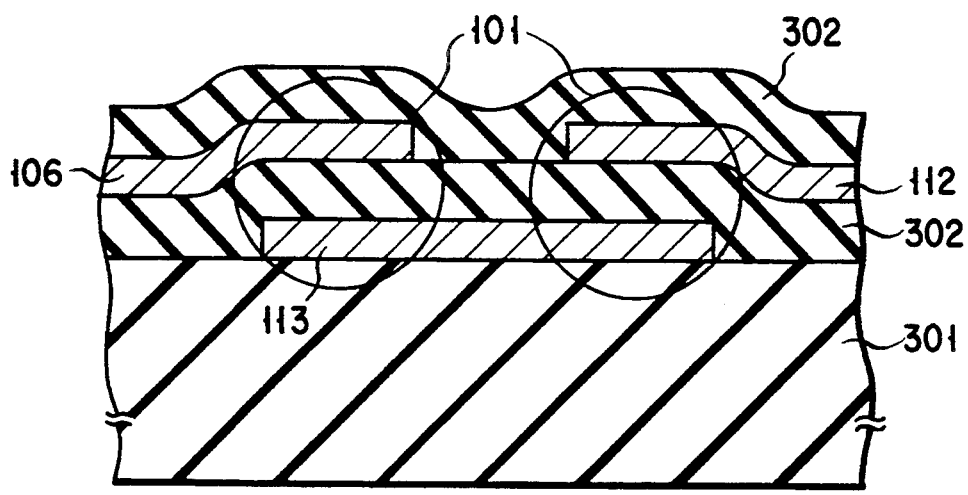
F I G. 13

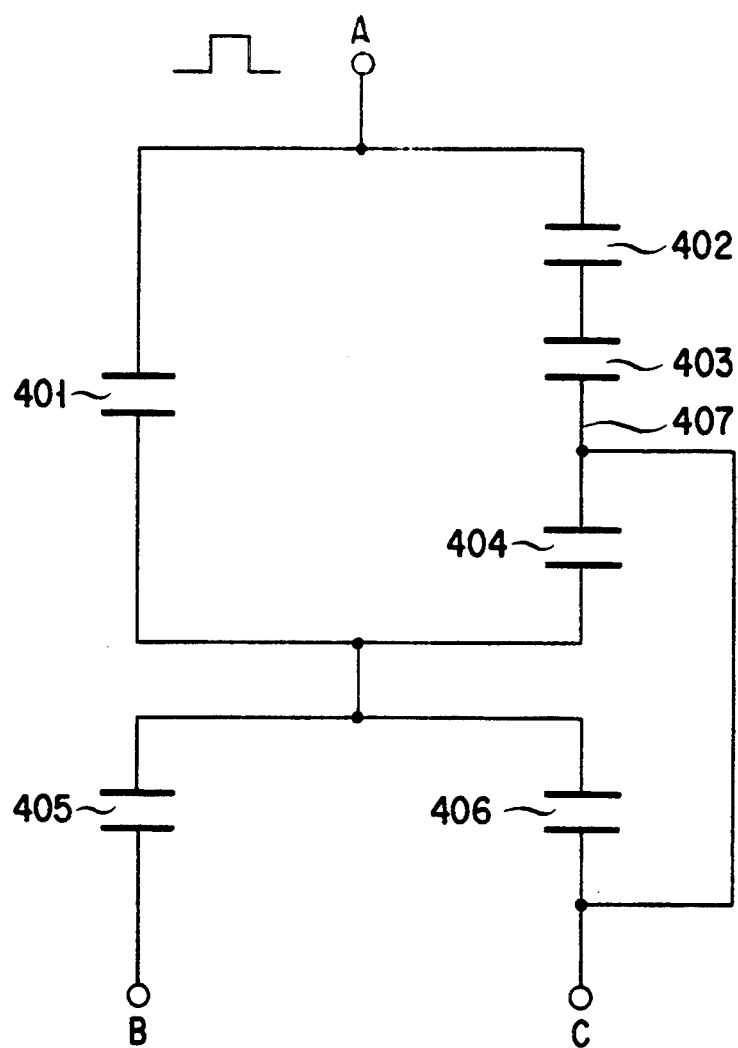
F I G. 14

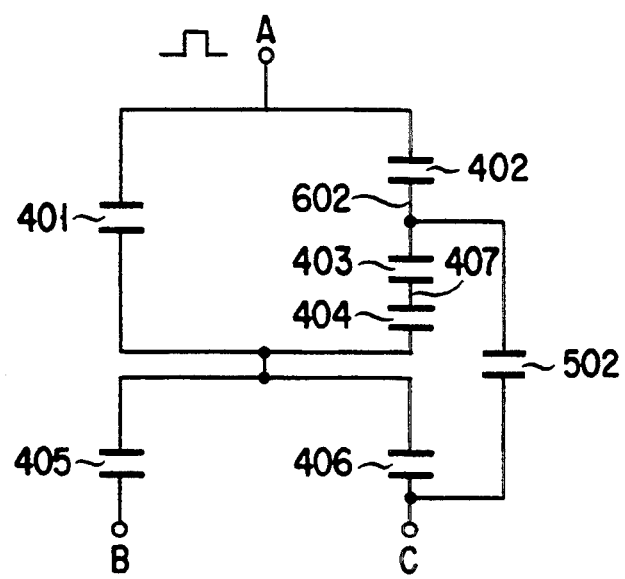
F I G. 16
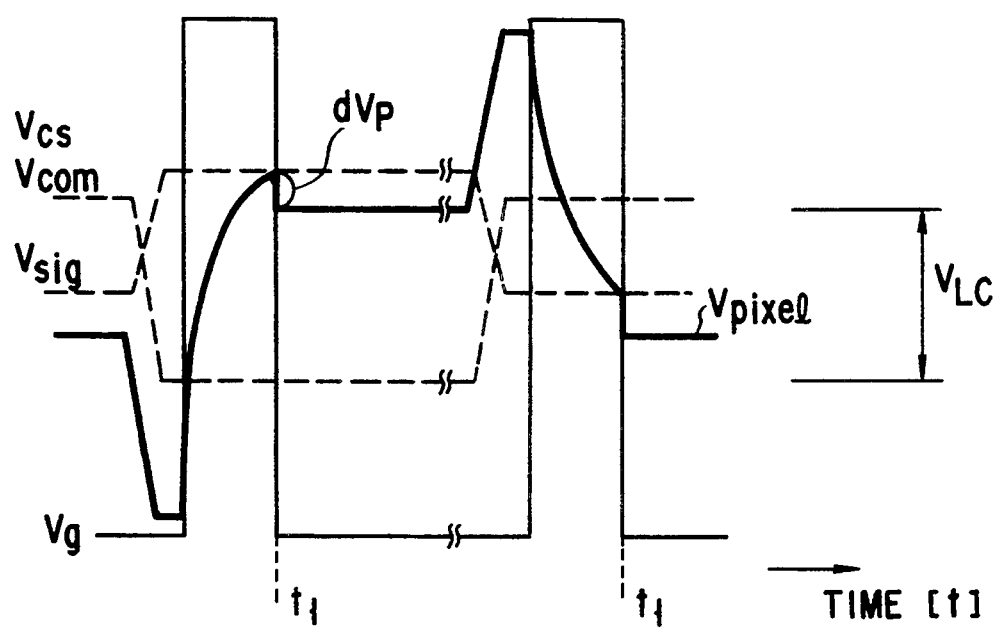
F I G. 17

LIQUID CRYSTAL DISPLAY HAVING DRAIN AND PIXEL ELECTRODES LINKABLE TO A WIRING LINE HAVING A POTENTIAL

This application is a continuation-in-part of application Ser. No. 07/596,026, filed on Oct. 11, 1990, now abandoned.

BACKGROUND OF THE INVENTION

1. Field of the Invention

The present invention relates to a liquid crystal display to be used as a flat panel display or the like and a method of manufacturing the same.

2. Description of the Related Art

An active matrix type liquid crystal display has a lot of picture elements and good image quality and is therefore expected to be promising as a flat panel display. However, as the number of picture elements is increased and a display area is enlarged, it becomes difficult to manufacture the entire surface of an active matrix substrate without any defect. For example, a 640×480-pixel color display actually has 640×3×480=921,600 picture elements, three picture elements for each pixel of the color display. Therefore, failure factors of the display such as a disconnection or a short-circuit must be eliminated throughout all of about 920,000 transistors, 1,920 signal lines, and 480 scanning lines.

FIG. 7 is a figure of equivalent circuit showing a circuit arrangement of a conventional active matrix substrate. As shown in FIG. 7, this unit picture element is constituted by one transistor and one auxiliary capacitor, and this arrangement is functionally satisfactory.

Possible display defects, however, are a "line defect" and a "point defect", and the "point defect" is far more easily generated. This is because the number of picture elements is much larger than that of lines and therefore a defect probability of the point defect differs from that of the line defect. Several modes are considered in the point defect. In addition, the point defect is easily generated due to a failure of a transistor and a short-circuit in an auxiliary capacitor. In the circuit shown in FIG. 7, if the transistor or the auxiliary capacitor fails, a corresponding picture element fails, and this bad element becomes a point defect.

Several methods of eliminating the point defect are known. FIG. 8 shows a conventional picture element as an example of these methods. In this figure of equivalent circuit of the picture element, two transistors as active elements are used in a single unit picture element. That is, as shown in FIG. 8, one transistor (Tr1) is connected to an nth scanning line and an mth signal line, and the other transistor (Tr2) is connected to an (n+1)th scanning line Gn+1 and the mth signal line Sm. If both the transistors Tr1 and Tr2 operate normally, a picture element voltage has a value written via the transistor Tr2. If the transistor Tr1 fails, the transistor Tr2 must be cut. In the latter case, however, a signal to be written by the transistor Tr1 is no longer a normal signal but becomes the same signal as that of a picture element immediately above the transistor Tr1. Note that when an image does not largely change upon shifting of one picture element as in a display such as a television image, this defect is not remarkable.

In an image apparatus for OA equipment, however, information cannot be correctly displayed unless each and every dot on a screen correctly indicates a signal. If two transistors are connected to a scanning line of this point defect portion in order to prevent this inconvenience, the capacitance of the scanning line is increased and propagation of a gate pulse is delayed. As a result, the sizes of the screen and the picture element are increased.

In order to reliably transmit a normal signal to a defective picture element, a plurality of scanning lines or signal lines may be provided for each picture element. In this method, however, the area of a wiring region is increased to reduce an aperture ratio, and adjacent wirings easily form short-circuits. That is, new defect generating factors are introduced in picture elements.

As described above, in the active matrix type liquid crystal display or the like, recovery methods based on conventional schemes are not effective to prevent generation of the point defect caused by, e.g., a failure of a transistor or a short-circuit in an auxiliary capacitor. In addition, if a redundant circuit is added to the display, a disadvantage such as an increase in manufacturing load or a reduction in aperture ratio is apparently caused. These disadvantages are pronounced when the size of an image apparatus is increased, its precision is improved, and its resolution is increased.

SUMMARY OF THE INVENTION

It is an object of the present invention to provide an image apparatus which can solve the above conventional problems and a method of manufacturing the same.

An apparatus of the present invention is a liquid crystal display comprising an active matrix substrate having a plurality of unit picture elements each including a picture element electrode arranged in a region surrounded by scanning lines and signal lines and a first active element (a transistor or diode) connected to a scanning line, a signal line, and the picture element electrode, an opposed substrate opposing the active matrix substrate, a liquid crystal layer sandwiched between the active matrix substrate and the opposed substrate, wherein a second active element (e.g., a second transistor) formed to be in a so-called electrically floating state is arranged in each unit picture element.

A method of manufacturing a liquid crystal display according to the present invention is a method of manufacturing a liquid crystal display in which a liquid crystal is sealed between an active matrix substrate having unit picture elements each including a picture element electrode arranged in a region surrounded by scanning lines and signal lines, a first active element (e.g., a first transistor) connected to a scanning line, a signal line, and the picture element electrode, and an electrically floating second active element (e.g., a second transistor), and an opposed substrate, comprising the steps of flowing a current through the scanning and signal lines to perform a display operation, thereby detecting a bad picture element, cutting a first active element (e.g., a first transistor) of the detected bad picture element to set the first transistor in a so-called floating state, and connecting a second active element (e.g., a second transistor) to the scanning and signal lines and the picture element electrode.

That is, according to the present invention, one picture element of the active matrix substrate has two or more transistors, and one of these transistors is already operatively connected to a picture element electrode, a scanning line, and a signal line. If, however, a display defect is found in the unit picture element, its bad element is disconnected from the circuit, and another normal transistor is connected to the circuit in place of the defective transistor, thereby easily recovering a normal operation of the unit picture element.

In a circuit arrangement in which an auxiliary capacitance (e.g., capacitor) is added to a unit picture element, two or more auxiliary capacitors may be used similarly to the above transistors. That is, in a normal operation, only one of the capacitors which is already connected operates. If this auxiliary capacitor fails, this capacitor is cut and another auxiliary capacitor is connected to the circuit, thereby recovering a normal operation.

In general, a transistor and an auxiliary capacitor on an active matrix substrate easily cause an interlayer short-circuiting due to dust and often fail. Since, however, the size of dust is normally very small, i.e., less than 10 micrometers, a probability of simultaneous failures of a plurality of adjacent elements is low. Therefore, on the basis of the assumption that a plurality of elements do not simultaneously fail, each picture element is constituted by a plurality of elements. As a result, even if a picture element temporarily fails, its normal operation can be easily and rapidly recovered without performing an operation of, e.g., adding a new element. That is, according to the present invention, one element (or a pair of elements), e.g., a transistor (or a pair of a transistor and an auxiliary capacitor) is connected beforehand. When the element fails, only the bad element is instantaneously cut by laser radiation or the like, and another normal element which is arranged in advance is instantaneously connected by laser radiation or the like, thereby writing (displaying) a normal signal. That is, recovery of a failure can be rapidly and easily performed.

Since one element or a pair of elements is or are connected to a circuit beforehand, detection (determination) of a bad element in a picture element can be easily performed, i.e., a bad element can be easily specified. Therefore, this detection step can be automatically performed.

In addition, since the number of wirings such as a signal line and a scanning line is limited to one per picture element, no extra wiring need be provided to recover a defective portion. Therefore, since the number of elements connected to each wiring is one per picture element, a capacitive load of the wiring is not unnecessarily increased. Therefore, specific electrical characteristics of a unit picture element are not undesirably changed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4B is a sectional view showing the liquid crystal display including an opposed substrate taken along a line A—A' in FIG. 4A;

FIG. 4C shows a sectional view along the line A—A' in FIG. 4A;

FIG. 5 is a circuit diagram showing a unit picture element of a liquid crystal display according to still another embodiment of the present invention;

FIG. 12 is a schematic plan view showing a conductive film employed in the liquid crystal display element of the fourth embodiment and having laser contact portions;

FIG. 13 is a schematic sectional view of the conductive film shown in FIG. 12;

FIG. 14 shows an equivalent circuit pertaining to one pixel of the liquid crystal display element of the fourth embodiment;

FIG. 16 shows an equivalent circuit pertaining to one pixel of the liquid crystal display element of the fifth embodiment; and FIG. 17 is a graph illustrating how common electrode inversion is performed.

DETAILED DESCRIPTION OF THE PREFERRED EMBODIMENTS

Figure 1:
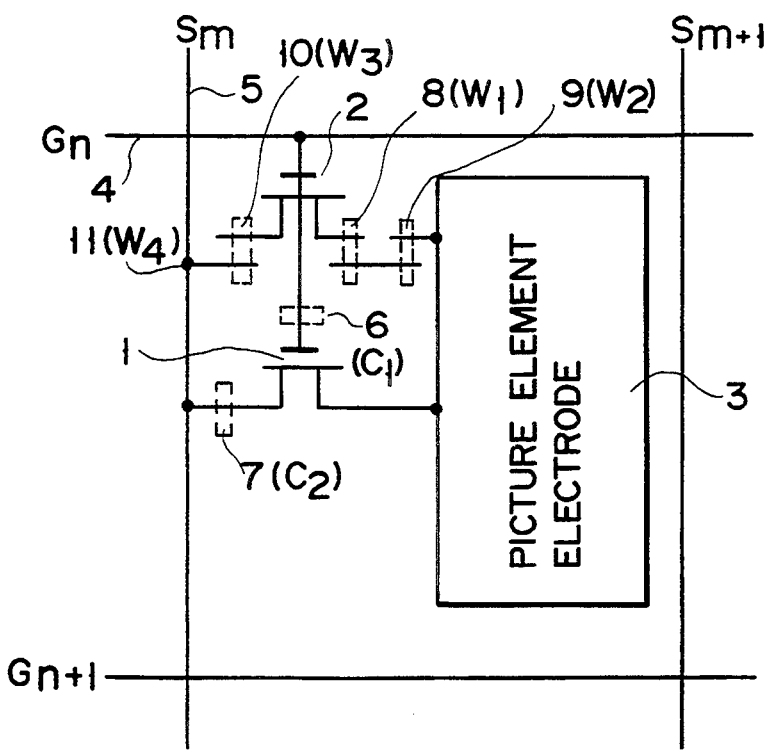
FIG. 1 is a circuit diagram showing a part of a liquid crystal display according to an embodiment of the present invention.

In FIG. 1, the schematic circuit diagram shows a unit picture element constituting an active matrix substrate for a liquid crystal display. As shown in FIG. 1, in this unit picture element, a first transistor 1 and a gate which are already connected are connected to a scanning line 4. A signal line 5 and a display picture element electrode 3 are not connected to each other. A second transistor 2 is arranged in a cut state with a cut 7 between the signal line 5 and the electrode 3. Examples of these transistors are an amorphous silicon thin film transistor and a polycrystalline silicon thin film transistor.

In this embodiment, as shown in FIG. 1, cut points of the transistor 2 are two portions (8 and 9) between the transistor 2 and the picture element electrode 3 and one portion (10) between the transistor 2 and the signal line. The number of cut points can be increased. For example, a line to be connected to the signal line 5 at a node 11 as shown in FIG. 1 may be arranged in a cut state in advance. Since the circuit is cut at a plurality of portions, a contact failure (short-circuit) may occur at a cut portion. However, since a probability of simultaneous contact failures at two or more cut portions is very low, lines which are already connected can be reliably electrically cut.

When the active matrix substrate having the above arrangement is to be used to form a liquid crystal display, whether a unit picture element which does not properly function is present, can be checked by a display operation test. That is, the active matrix substrate and an opposed substrate are adhered with a gap of several micrometers therebetween, and a liquid crystal is injected in the gap to form a liquid crystal display. Thereafter, power is supplied to cause the liquid crystal display to perform a display operation, thereby detecting a bad portion. In a normally white (white (e.g. positive) obtained when no voltage is applied to a liquid crystal) mode, black (e.g. negative) is displayed on a portion of a screen, and this black portion is moved and observed. If an ON current of a transistor is insufficient or an amount of a leakage current is large, this portion changes to white. Therefore, a failure of a transistor in this changed portion is easily found.

As another (bad portion detecting) method, a bad portion can be rapidly found by changing a (display) timing of a signal or changing the width of a gate pulse.

When a bad portion of a transistor is found by the above methods, this bad portion is determined to be the transistor at any time 1 since only one transistor is connected to a corresponding unit picture element.

In order to cut the bad transistor 1, connection layers (indicated by broken lines) 6 and 7 are cut and non-connection layers (indicated by broken lines) 8, 9, and 10 are shorted-circuited.

Figure 2A:
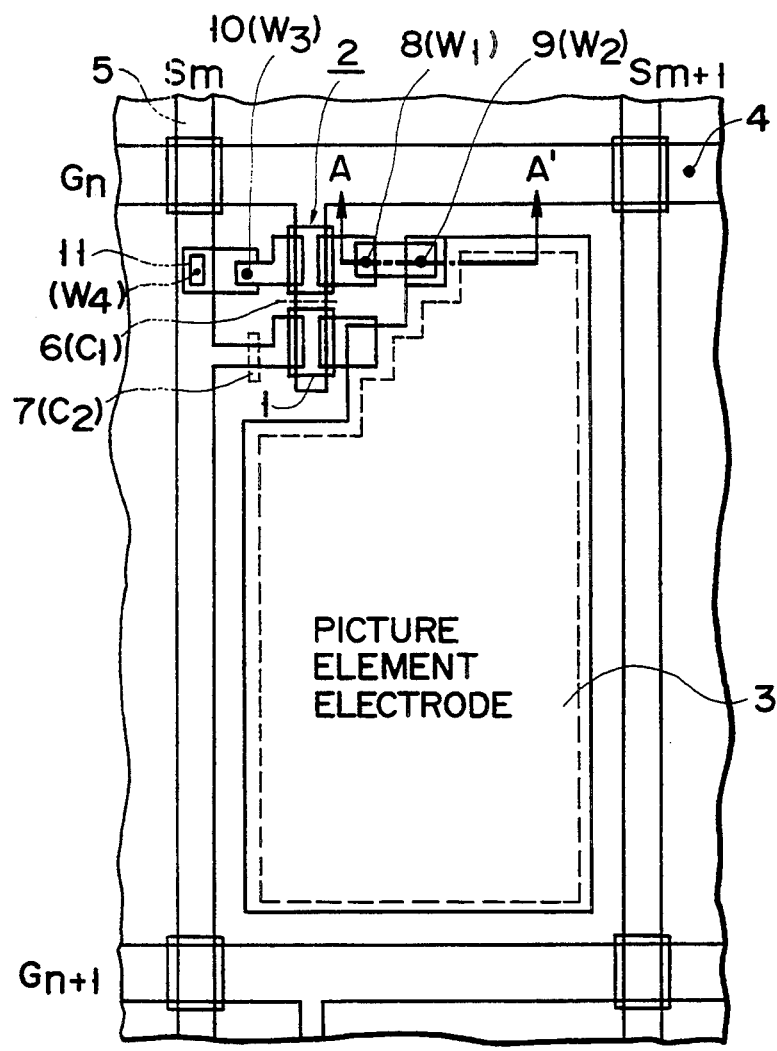
FIG. 2A is a schematic view showing a pattern of a practical liquid crystal display using the circuit shown in FIG. 1.
Figure 2B:
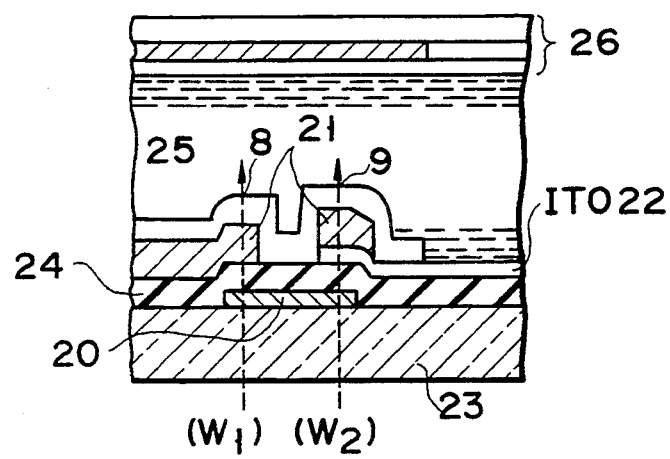
FIG. 2B is a longitudinal sectional view showing the liquid crystal display taken along a line A—A' in FIG. 2A.

FIGS. 2A and 2B are plan and longitudinal sectional views showing a cutting operation of an actual unit picture element.

FIG. 2A is a plan view schematically showing a practical pattern using the circuit shown in FIG. 1. As shown in FIG. 2A, in a cutting operation (step) of the first transistor 1, portions at the position of a connection layer (e.g. capacitor) C1 connecting the gate and the scanning line 4 and the position of a connection layer (e.g. capacitor) C2 connecting the signal line and a source electrode are melted and evaporated by laser radiation to perform trimming, thereby completing the cutting operation step.

As shown in the longitudinal sectional view of the unit picture element in FIG. 2B, a connection portion in a connecting operation step of the second transistor 2 is a portion at which a lower electrode 20 and an upper electrode 21 are initially vertically overlapped and insulated via an interlayer insulating film 24. When a laser beam is radiated on this overlapped portion in directions indicated by broken-line arrows $W_1$ and $W_2$, the insulating film 24 is destroyed, and the lower and upper electrodes 20 and 21 are melted and connected. This laser radiation is performed on an arbitrary surface of an element formed on a glass substrate 23, and a display state of a corresponding powered picture element can be observed through the glass substrate 23. Therefore, by sequentially or simultaneously radiating a laser beam on connecting points $W_1$ (8), $W_2$ (9), and $W_3$ (10) shown in FIG. 2A, the transistor 2 is connected to the picture element electrode 3 and the signal line 5.

An arrangement of this connection portion is not limited to that of the above embodiment. For example, the interlayer insulating film 24 can be constituted by including a semiconductor layer. In addition, the material of the upper and lower electrodes may be the same as or different from that of the general gate or the source/drain.

As is apparent from FIG. 2A, since a signal is written as a normal signal in the picture element electrode 3 via the transistor 2, a point defect can be satisfactorily recovered. In addition, before recovery, the transistor 2 is connected to the scanning line 4 but is set in an electrically floating state because it is cut from the signal line 5 and the electrode 3. Therefore, the transistor 2 hardly serves as a capacitive load on the scanning line 4. For this reason, substantially the same propagation delay as that of a conventional single transistor type picture element is realized. In addition, since the cut element is in an electrically floating state, an effect similar to that of a conventional picture element is obtained upon recovery.

This embodiment is applied to an active matrix liquid crystal display having 1,920×480 picture elements and a diagonal of 10 to 12 inches, and, for example, all of several point defects can be eliminated by recovery. As a result, almost no difference is found in display characteristics of the recovered picture element from those of surrounding normal picture elements, i.e., a good non-defective picture element is obtained, and the manufacturing yield is largely improved.

In this embodiment, the layer between the transistor 2 and the picture element electrode 3 is cut at two portions, and these cut portions actually have small electrical capacitances in addition to the above effects. Since the number of cut portions is two, these portions are connected in series with each other to further reduce their capacitances. As a result, noise of a gate pulse produced by a gate-source capacitance of the transistor 2 is prevented from entering into the picture element electrode 3, thereby reducing a noise amount.

Figure 3:
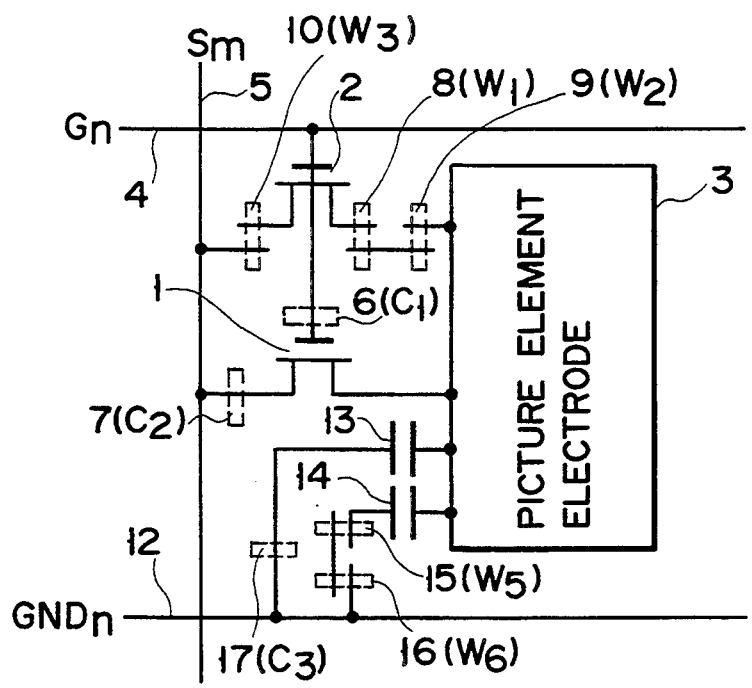
FIG. 3 is a circuit diagram showing a part of a liquid crystal display according to another embodiment of the present invention.
Figure 4A:
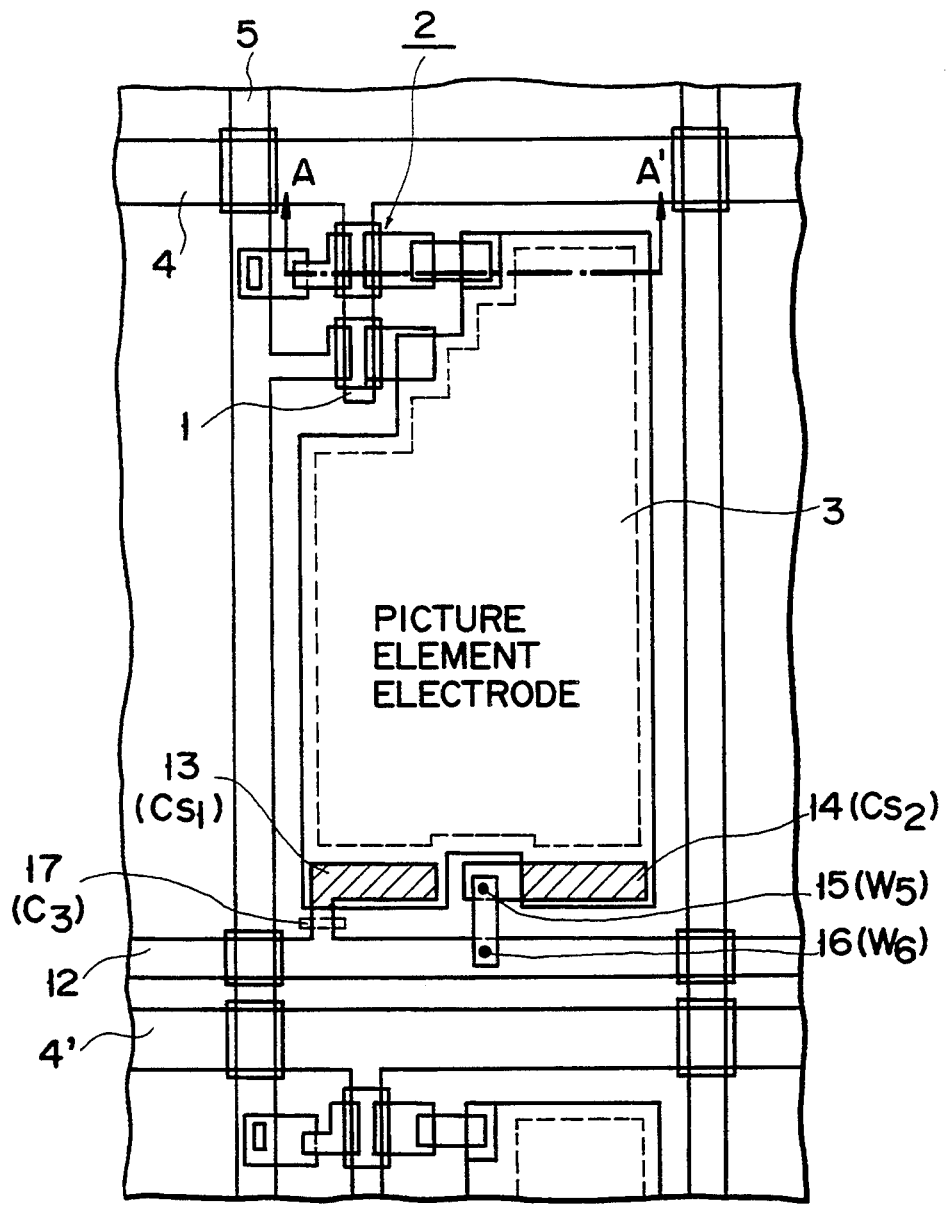
FIG. 4A is a plan view showing a pattern of a practical liquid crystal display using the circuit shown in FIG. 3.

FIG. 3 is a circuit diagram for explaining another embodiment of the present invention, FIG. 4A is a plan view showing one pattern of a practical unit picture element using the circuit shown in FIG. 3, and FIG. 4B is a sectional view showing the pattern including an opposed substrate taken along a line A—A' in FIG. 4A.

In this embodiment, an auxiliary capacitor is used in addition to a transistor in a unit picture element. That is, an auxiliary capacitor 13 is constituted by an ITO 22 as a picture element electrode, a lower electrode consisting of the same material as that of a ground line 12, and an insulator sandwiched between the electrodes. One end of the auxiliary capacitor 13 is connected to the picture element electrode 3, and its other end is connected to the ground line 12. An auxiliary capacitor 14 is disconnected from the ground line 12 at two non-connection layers (indicated by broken lines in FIG. 3—closed circles in FIG. 4A) 15 and 16. Transistors 1 and 2 have the same arrangement as that of the above embodiment.

An auxiliary capacitor failure means, a phenomenon in which two electrodes shorted-circuit to cause an electric charge of a picture element to leak to a ground line. This phenomenon can be easily determined since a display state changes as a voltage (applied) to the ground line is changed. If a bad portion is present in the auxiliary capacitor, it is determined that the bad portion is present in an already connected one (auxiliary capacitor 13). In this case, a corresponding portion is cut (e.g., laser cutting is performed for a connection layer (indicated by a broken line) 17 (C3), and laser welding is performed to connect non-connection layers (indicated by broken lines) 15 ($W_5$) and 16 ($W_6$) by welding as in the above embodiment in order to connect the originally disconnected auxiliary capacitor 14 ($CS_2$) to the ground line 12, thereby recovering the picture element. In this manner, this picture element is easily recovered with almost no change in display function. Since the capacitive load of the ground line in particular is (electrically) not changed before and after the recovery operation, the same ground line resistance per unit picture element may be generally adopted as in the case of an auxiliary capacitor.

Additionally, one transistor and two capacitors may be constituted in a unit picture element.

FIG. 4C shows a modification of the embodiment depicted in FIG. 4B and is a sectional view taken along line A—A′ in FIG. 4A.

Referring to FIG. 4C, an undercoating layer 402 is formed on a transparent glass substrate 23. The undercoating layer 402 has the same thickness as the undercoating layer shown in FIG. 4B and is formed in a similar manner thereto. To be specific, the undercoating layer 402 is an insulating film of $SiO_x$ which is formed either by performing sputtering with $SiO_2$ as a target or by performing CVD (e.g., thermal CVD or plasma CVD) using a mixture of $SiH_4$ and $O_2$ (or $N_2O$) as a raw material gas. The undercoating layer 402 has a thickness in the range of 500 to 1,000 Å. The undercoating layer 402 may also be formed of $TaO_x$ or $SiN_x$, if so desired.

Also, the undercoating layer 402 may be formed by spin-coating a liquid containing a silicon oxide and baking the spin-coated liquid.

An MoTa alloy film having a thickness of 2,500 Å is formed by sputtering and is patterned to form a gate electrode 401 and a repair electrode 20. A gate wiring line (i.e., a scanning line) may be formed to have a double structure wherein a thin aluminum wire is surrounded by an MoTa line. Alternatively, the gate wiring line may be made by a film formed of an alloy of Cu or another high-melting point metal. The scanning line and the gate electrode 401 may have the same structure; alternatively, the scanning line and the gate electrode 401 may be formed in such a manner that the scanning line includes an Al lower layer and the gate electrode 401 does not. The repair electrode 20 vertically overlaps with electrode 408, as is depicted in FIG. 4C. Instead of this structure, the repair electrode may be extended to also overlap with silicide wiring electrode 406 (to be mentioned later), as is indicated by the broken lines and by extended region 20b in FIG. 4C. Where the repair electrode includes extended region 20b, electrode 408 need not be formed. The undercoating layer 402, the gate electrode 401 and the repair electrode 20 are covered with a gate insulation film 403. This gate insulation film is a laminated film formed by plasma CVD and made up of an $SiO_x$ layer and an $SiN_x$ layer. The thicknesses of the $SiO_x$ and $SiN_x$ layers are 3,500 Å and 500 Å, respectively. The $SiO_x$ layer may be formed by thermal CVD performed under an atmospheric pressure. An a-Si film 404 having a thickness of 500 Å is deposited over the gate insulation film 403, and an $SiN_x$ film 410 serving as an upper insulation film and having a thickness of 2,500 Å is deposited on the a-Si film 404.

Positive resist is coated on the upper insulation film 410, and the positive resist is exposed to ultraviolet rays radiated from the underside of the substrate. Further, except for the TFT portion, the resist is exposed to the light rays radiated thereto from above the substrate by use of a photo mask, so as to form a resist pattern having substantially the same width as the gate electrode 401. Using the resist pattern as a mask, etching is performed.

Next, an n-type layer serving as a source/drain layer is formed in the a-Si film 404 by ion doping. To be more specific, a gas mixture containing a phosphine gas ($PH_3$) is decomposed into ions by discharge, and the ions are accelerated and doped into side portions of the a-Si film 404. When the ion doping is performed, the upper insulation film 410 serves as a mask, so that the n-type layer is not formed under the upper insulation film 410. The n-type layer is indicated by dots in side portions 405 of film 404 in FIG. 4C.

Next, a silicide wiring layer 406 is formed by providing a metal film (e.g., an Mo film) on the n-type layer and annealing the metal film. The reason for forming the silicide wiring layer 406 is that the n-type layer has such a high sheet resistance (in the range of 10 to 100 $M\Omega/\square$) that it cannot be used as a wiring element. By forming the silicide wiring layer 406, the sheet resistance of the n-type layer can be reduced to 100 $M\Omega/\square$ or less, which is a smaller value than the on-resistance of the TFT.

Further, a pixel electrode 3 is formed by sputtering and patterning an ITO.

After the patterning for a contact hole, Mo and Al are deposited by sputtering such that the deposited Mo and Al have thicknesses of 500 Å and 4,000 Å, respectively, and then the deposited Mo and Al are patterned, so as to form source and drain electrodes 407 and 408. Electrode 409, formed of the same material as the source and drain electrodes 407 and 408, is provided on the ITO electrode (pixel electrode) 3 such the electrode 409 is located at a position to be irradiated with a laser beam. However, electrode 409 need not be formed, if so desired.

A passivation film 411 having a thickness of about 2,000 Å is formed by depositing a $SiN_x$ film by plasma CVD. Subsequently, those portions of the passivation film 411 which are located on the pixel electrode 3 and in the vicinity thereof are removed by etching, thereby completing the formation of an array substrate.

The array substrate is coupled to an opposing substrate 26, and a liquid crystal 25 is introduced into the region between the two substrates, so as to obtain a liquid crystal cell. The opposing electrode 26 is made up of a color filter 26b, a black matrix 26c, and a transparent electrode typically comprising ITO, formed on the color filter 26b and black matrix 26c.

When, at the time of a repairing operation, the lower electrode (i.e., element 20) and the upper electrode (i.e., elements 408, 3/409) are connected together, a laser beam is radiated from the reverse side of the array substrate by means of a YAG laser, for example. The laser irradiation is performed such that the spot diameter is about 5 μm and the energy density is in the range of 5 to 20 J/cm² (normally, 10 J/cm²).

Figure 6:
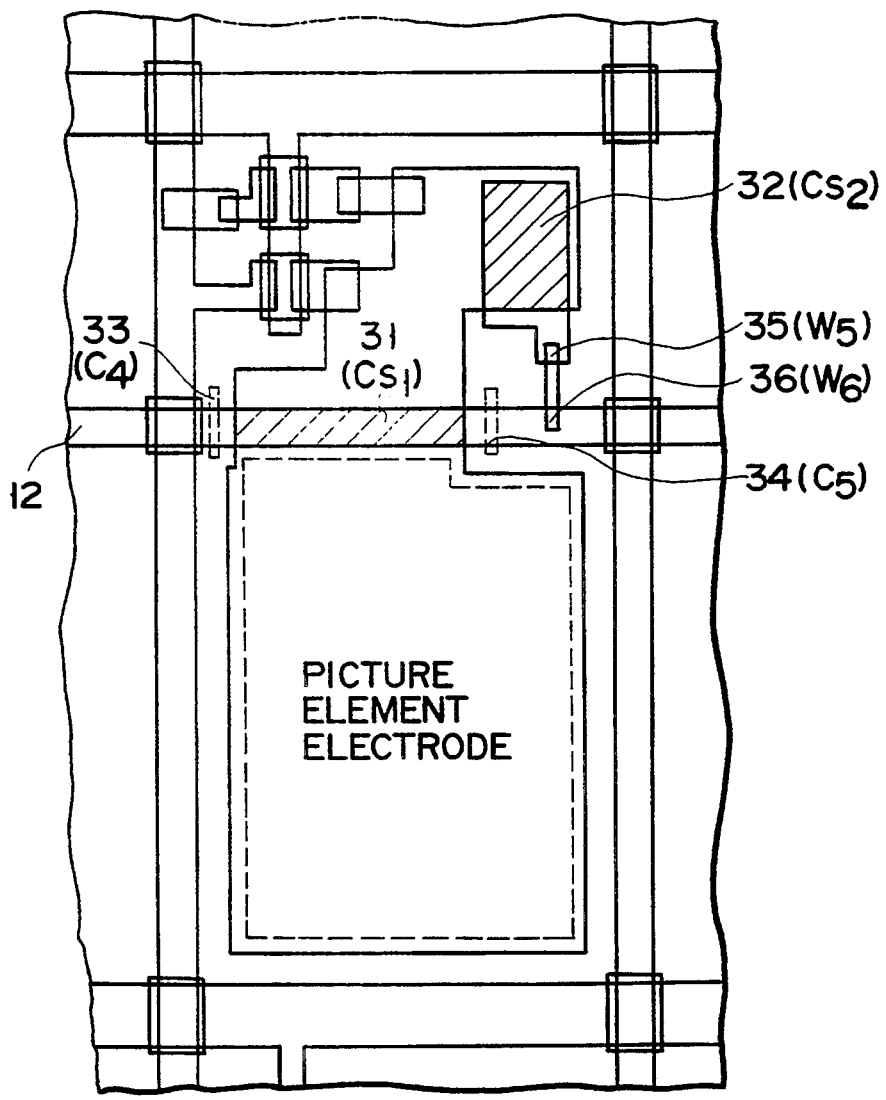
FIG. 6 is a plan view showing a practical unit picture element using the circuit shown in FIG. 5.
Figure 7:
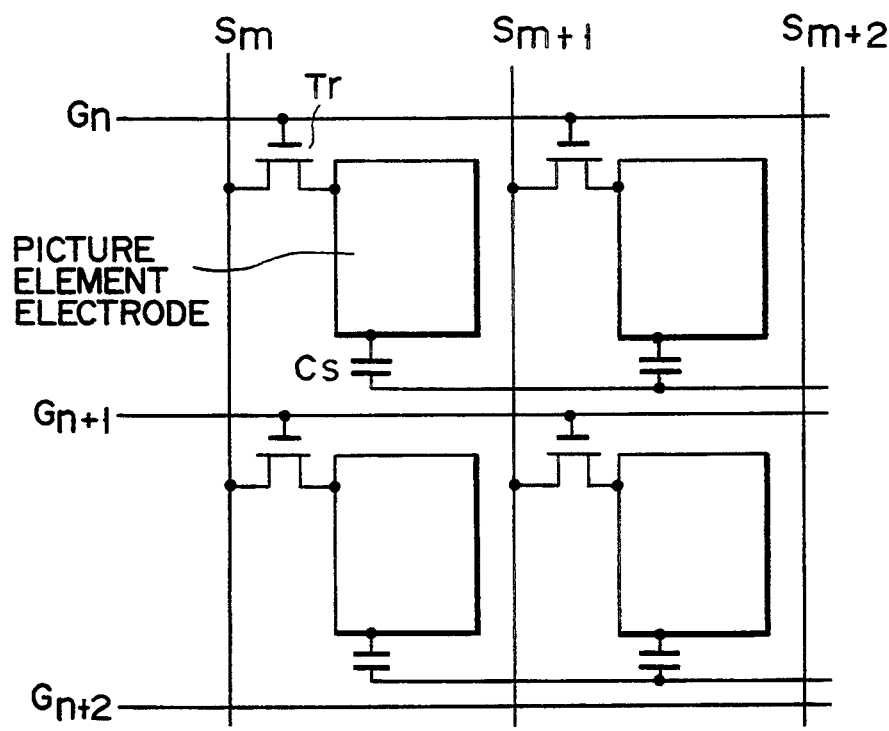
FIG. 7 is a figure of an equivalent circuit showing a conventional picture element.
Figure 8:
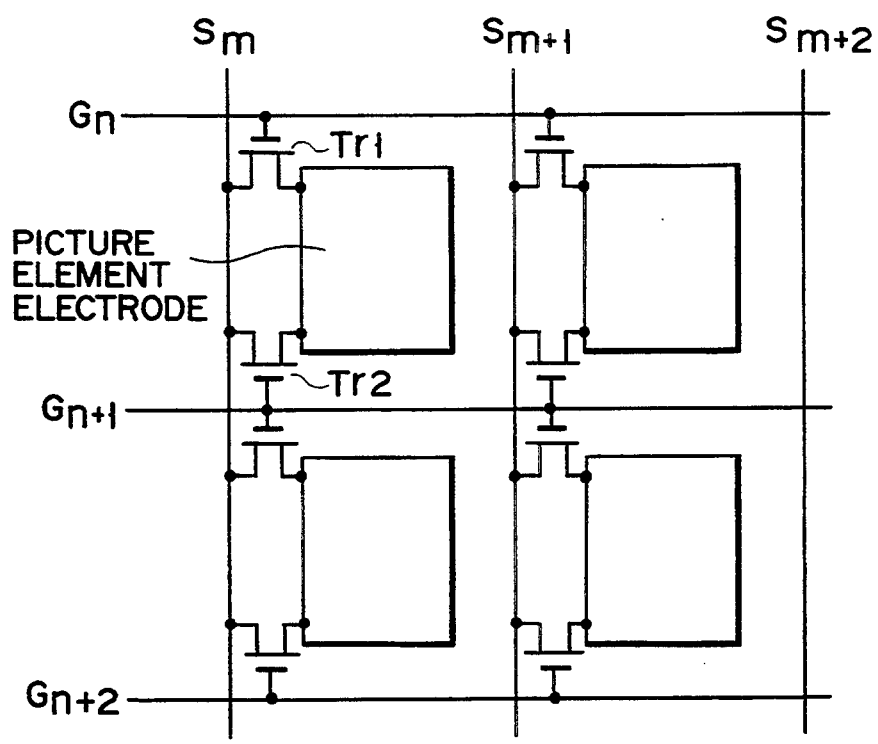
FIG. 8 is a figure of an equivalent circuit showing another conventional picture element.

FIG. 5 is a circuit diagram of a unit picture element schematically showing still another embodiment of the present invention, and FIG. 6 is a plan view schematically showing a practical unit picture element using the embodiment shown in FIG. 5.

This embodiment is another embodiment of a picture element having a transistor and an auxiliary capacitor similar to that shown in FIG. 3 except that the structure of an auxiliary capacitor is different from that shown in FIG. 3.

In the arrangement shown in the embodiment of FIG. 4A, a probability of short-circuiting is high since the ground line 12 and a scanning line (Gn+1) 4' of the next unit picture element are formed close to each other. In this embodiment, as shown in FIGS. 5 and 6, a ground line 12 is formed between two scanning lines 4 and 4'. A preconnected auxiliary capacitor 31 (CS₁) is formed between the ground line 12 crossing the picture element and a picture element electrode 3. An auxiliary capacitor 32 is initially isolated from ground line 12 at two cut portions 35 and 36. If the auxiliary capacitor 31 (CS₁) fails in such a wiring pattern, the ground line 12 is cut at two portions (33 and 34) and the preliminary auxiliary capacitor 32 is connected to the ground line 12, as shown in FIG. 6. That is, an auxiliary capacitance layer of the capacitor 31 (CS₁) stacked at the same position as the ground line 12 is laser-cut at connection layers (indicated by broken lines) 33 (C₄) and 34 (C₅), and the function of a power supply layer of the ground line 12 is maintained. Laser welding is performed at non-connection layers (indicated by broken lines) 35 (W₅) and 36 (W₆), and the preliminary auxiliary capacitor 32 (CS₂) is connected to the ground line 12 to recover the defect.

As shown in FIG. 4B, the opposed substrate is constituted by a plurality of layers. That is, the uppermost layer of the opposed substrate consists of transparent glass, and its second layer adjacent to this glass layer 26a has a portion opposing the picture element electrode 3. This portion is constituted by a semitransparent color filter (G, R, and B) 26b and a black matrix (BM) 26c which covers a circuit portion of the unit picture element except for a display surface. The opposed substrate also includes an indium tin oxide layer (ITO) as shown therein. Therefore, only a display pattern (mark) appearing in a liquid crystal 25 can be seen through the filter 26b like a window. As shown in FIG. 4B, the insulator which forms the transistor is constituted by two layers of a gate insulator 24a consisting of SiOₓ/SiNₓ (SiOₓ/SiNₓ means a stacked structure consisting of an SiOₓ layer and an SiNₓ layer) and an undercoated insulator 24b.

Note that the structure of the transistor is not limited to that shown in FIG. 4B. For example, an etching stopper insulator may be formed in the transistor portion shown in FIG. 4B, or an n+/i layer may be continuously formed and only an n+layer at a channel portion may be etched. In addition, a self-alignment TFT may be adopted.

Figure 9A:
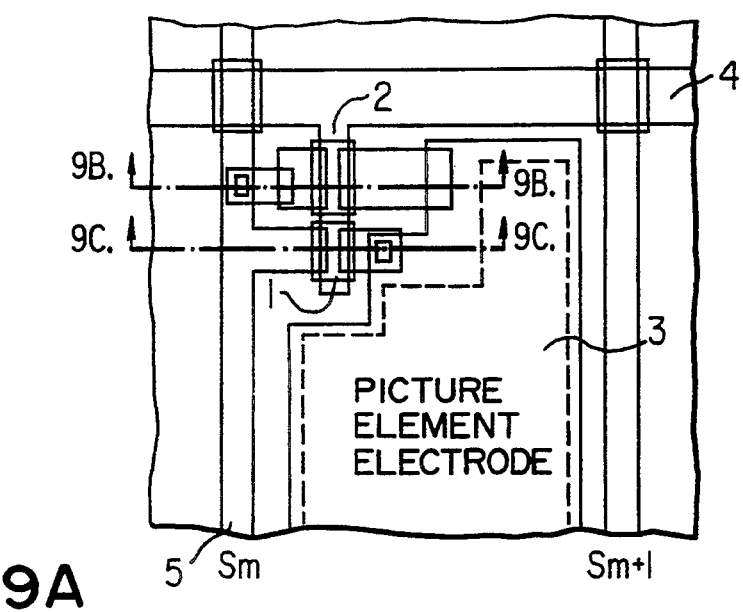
FIG. 9A is a plan view of a picture element of the present invention.
Figure 9B:
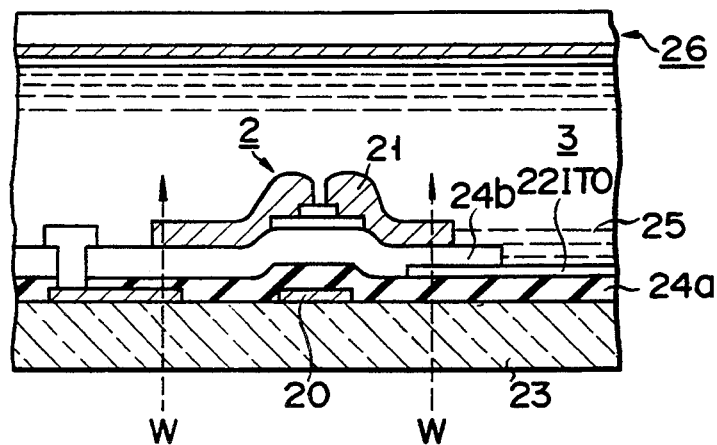
FIG. 9B is a longitudinal sectional view of the picture element, taken along line A—A' in FIG. 9A.
Figure 9C:
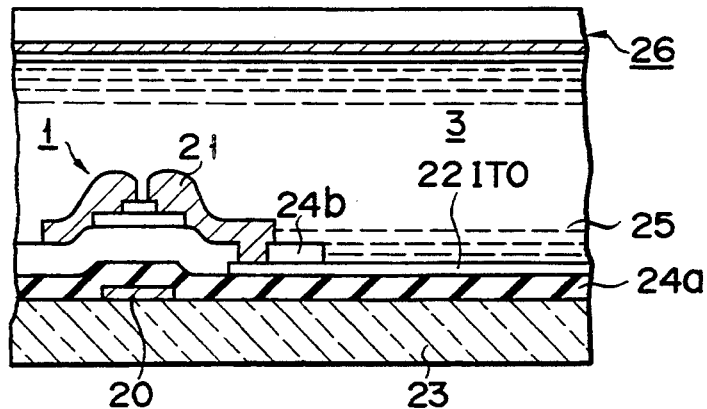
FIG. 9C is a longitudinal sectional view of the picture element, taken along line B—B' in FIG. 9A.
Figure 10A:
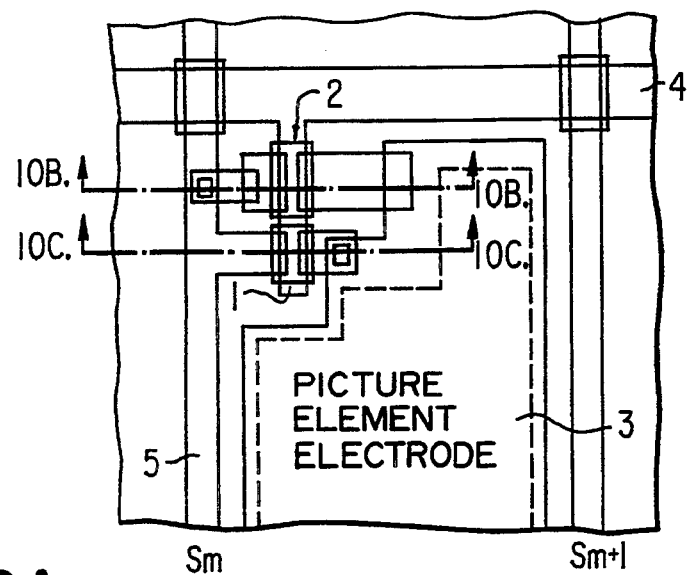
FIG. 10A is a plan view of another picture element of the present invention.
Figure 10B:
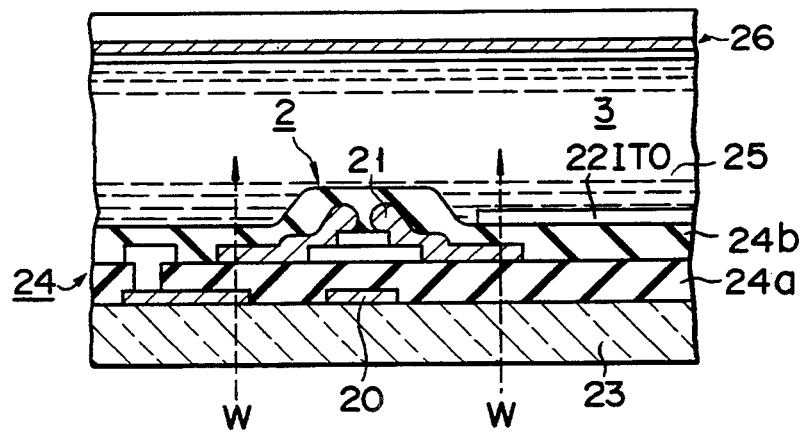
FIG. 10B is a longitudinal sectional view of the picture element, taken along line A—A' in FIG. 10A.
Figure 10C:
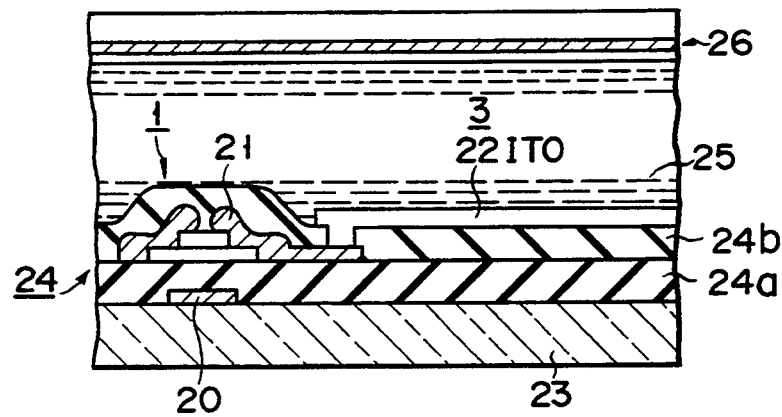
FIG. 10C is a longitudinal sectional veiw of the picture element, taken along line B—B' in FIG. 10A.

FIGS. 9 and 10 are longitudinal sectional views each showing a layer structure including the transistor portion 2 and the picture element electrode 3 of the unit picture element.

Referring to FIG. 9, the transistor 1 and the electrode 3 can be connected by forming a contact hole in an insulator 24b. That is, FIG. 9 shows a relationship between the transistor portion 2 formed in an arbitrary position of the insulating substrate 23 consisting of glass or the like and the picture element electrode 3 separated into a plurality of layers by the insulators 24a and 24b. As shown in FIG. 9, one end of the upper electrode 21 is arranged above, in a stacking direction, the ITO (Inidum Tin Oxide) 22 as the picture element electrode of the liquid crystal 25 sandwiched between the interlayer insulator 24a and the transparent insulator 24b.

Referring to FIG. 10, a positional relationship between the ITO 22 and the upper electrode 21 is opposite to that shown in FIG. 9. That is, as shown in FIG. 10, the upper electrode 21 is covered with a portion of the upper insulator 24b and stacked on the interlayer insulator 24a. The upper electrode 21 is located below, in the stacking direction, the electrode 22 stacked on the insulator 24b.

More specifically, the above two embodiments show modifications of the stacking position of the picture element electrode 3, in both of which the upper electrode 21 of the transistor and the picture element electrode 3 are overlapped in the stacking direction via the upper insulator 24b. Therefore, when laser radiation is performed on the overlapped portion in the direction indicated by a broken-line arrow W in FIG. 9 or 10, the insulator in this portion is destroyed, and the two electrodes (the picture element electrode 3 and the upper electrode 21) present above and below this portion are melt-connected. Adjacent signal lines 5, denoted Sₘ and Sₘ₊₁ are shown in FIGS. 9 and 10.

In each of the embodiments shown in FIGS. 9 and 10, by forming the ITO (Indium Tin Oxide) 22 of the picture element electrode and the upper electrode 21 in different layers, a probability of a contact failure (i.e., a short-circuit) between the two electrodes can be reduced in addition to the above effects.

In the arrangement shown in FIG. 10, since the picture element electrode cannot be arranged at the uppermost portion, the uniformity of a i.e. cell gap (cell interval) can be improved, and a probability of occurrence of a rubbing failure upon orientation (e.g. opposed arrangement) can be reduced.

An active matrix type TFT liquid crystal element according to the fourth embodiment of the present invention will now be described.

Figure 11:
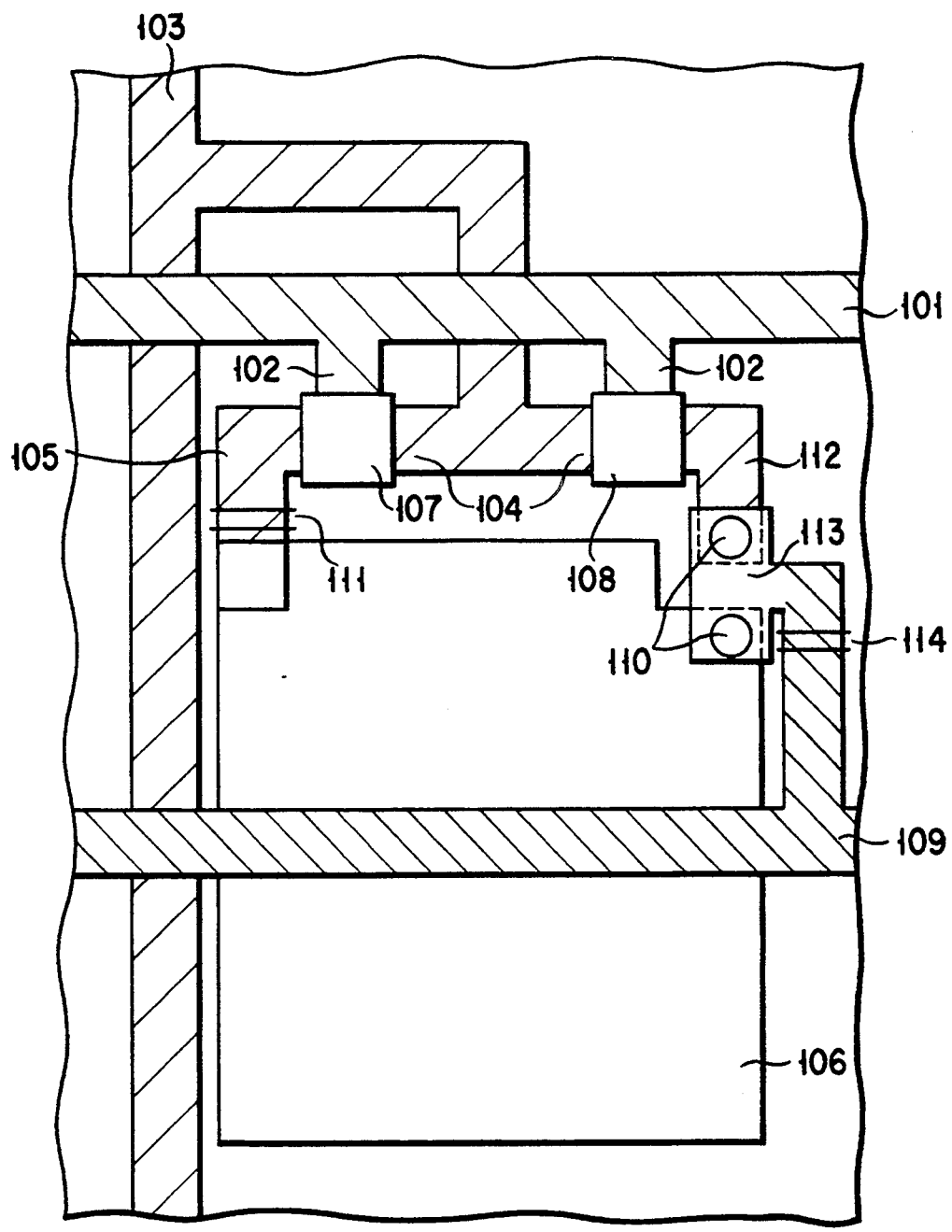
FIG. 11 is a schematic plan view showing the structure of the liquid crystal display element according to the fourth embodiment of the present invention.

FIG. 11 is a plan view showing how one pixel of a TFT array looks like when viewed from the substrate. In FIG. 11, the illustration of an interlayer insulating film is omitted.

Referring to FIG. 11, reference numeral 107 denotes a first TFT serving as a first switching element, and references numeral 108 denotes a second or auxiliary TFT serving as an auxiliary switching element. A scanning line 101 is connected to gate electrodes 102, and a signal line 103 is connected to drain electrodes 104. The first TFT and the auxiliary TFT are switched on or off, depending upon the potential at the scanning line 101. A source electrode 105 is connected to a pixel electrode 106, and second conductive films 113 overlaps with a source electrode 112, with an insulating layer interposed, such that the overlapping portion is located at the laser contact portions 110. The second conductive films 113 can be connected to the auxiliary TFT by laser beam irradiation. The pixel electrode 106 also serves as a first conductive film. The second conductive films 113 overlaps with the pixel electrode 106, with an insulating layer interposed, and can be electrically connected to the pixel electrode 106 by laser beam irradiation. A wiring line 109 is connected to a common electrode. The potential of the wiring line 109 is maintained at a constant value, so that the potential of the second conductive films is also maintained at a constant value. The wiring line 109, the pixel electrode 106, and the insulating layer interposed therebetween jointly constitute a capacitor.

In the TFT array of the above structure, the first TFT is switched on when the signal line 103 and the scanning line 101 are applied with a signal voltage and a scanning voltage, respectively. As a result, a signal is supplied to the pixel electrode 106.

The first TFT 107 is connected to the pixel electrode 106, while the auxiliary TFT 108 (i.e., an auxiliary switching element) is electrically isolated from the pixel electrode 106 by means of the laser contact portions 110.

If the first TFT 107 is determined to be defective, the laser contact portions 110 are electrically connected together by laser beam irradiation. Further, by laser beam irradiation, the source electrode 105 of the first TFT 107 is cut at the portion indicated by 111 in FIG. 11, and the wiring line 109 is cut at the portion indicated by 114. As a result, the auxiliary TFT 108 is electrically connected to the pixel electrode 106. Since it is not likely that the two TFTs will become defective simultaneously, a defective pixel element can be repaired almost 100%.

The structures of the laser contact portions 110, the pixel electrode 106 (i.e., the first conductive film), the second conductive films 113 and the source electrode 112 will be explained with reference to FIGS. 12 and 13.

The source electrode 112 is connected to the auxiliary TFT 108. The second conductive films 113 are connected to the wiring line 109 whose potential is maintained at a constant value, so that the pixel electrode 106 is free of the adverse effects arising from a variation in the potential of the scanning line. Hence, the parasitic capacitances at the auxiliary TFT and the laser contact portions 110 are suppressed and do not become a problem when a repairing operation is not performed.

The parasitic capacitances of the auxiliary TFT and laser contact portions 110 become a problem only when the potential of the scanning line varies (i.e., only when the TFT is turned off). Therefore, the potential of the second conductive films 113 should be maintained constant at least when a signal potential varies.

FIG. 13 is a cross sectional view taken along line A—A' in FIG. 12. In FIG. 13, an insulating film and a substrate are depicted.

As is shown in FIG. 13, the second conductive film 113 is formed on the substrate 301, and the insulating film 302 is formed in such a manner as to cover the second conductive film 113. The pixel electrode 106 and the source electrode 112 (which is electrically connected to the auxiliary TFT) are located on the insulating film 302. Another insulating film 302 is formed in such a manner as to cover the pixel electrode 106 and the source electrode 112. The laser contact portions 101 are indicated by the circles in FIG. 13.

The laser contact portions 101 are connected together by merely irradiating them with a laser beam from the underside of the substrate or from above the substrate.

FIG. 14 shown an equivalent circuit corresponding to the case where the liquid crystal element of the fourth embodiment is not repaired.

In the equivalent circuit shown in FIG. 14, reference numeral 401 denotes a parasitic capacitance between the gate and source of the first TFT, 402 denotes a parasitic capacitance between the gate and source of the auxiliary TFT, 403 denotes a parasitic capacitance of the laser contact portion located near the auxiliary TFT, 404 denotes a parasitic capacitance of the laser contact portion located near the pixel electrode, 405 denotes a liquid crystal capacitance, and 406 denotes an accumulated capacitance. Terminal A is connected to the scanning line, and terminals B and C are connected to the common electrode. The second conductive film indicated by 407 in FIG. 14 is connected to terminal C, whereby the potential of the second conductive film 407 is maintained at a constant value.

The potential of the second conductive film 407 is maintained at a constant value. Therefore, even if a pulse wave such as that indicated in FIG. 14 is input from the scanning line, a potential variation corresponding to a punch-through voltage which arises from both the parasitic capacitance 402 between the gate and the source of the auxiliary TFT and the parasitic capacitance 403 of the laser contact portion located near the auxiliary TFT, is not transmitted to the liquid crystal capacitance 405 or the accumulated capacitance 406 since a charge is supplied from terminal C to part 407 of the source electrode. In other words, parasitic capacitances 402, 403 and 404 do not have any effect on the pixel electrode. Since the effect arising from the punch-through voltage is the same for a repaired pixel and an unrepaired pixel, a high-quality liquid crystal element having no irregular pixel arrangement on the screen can be manufactured with a good yield.

An active matrix type TFT liquid crystal element according to the fifth embodiment of the present invention will be described.

Figure 15:
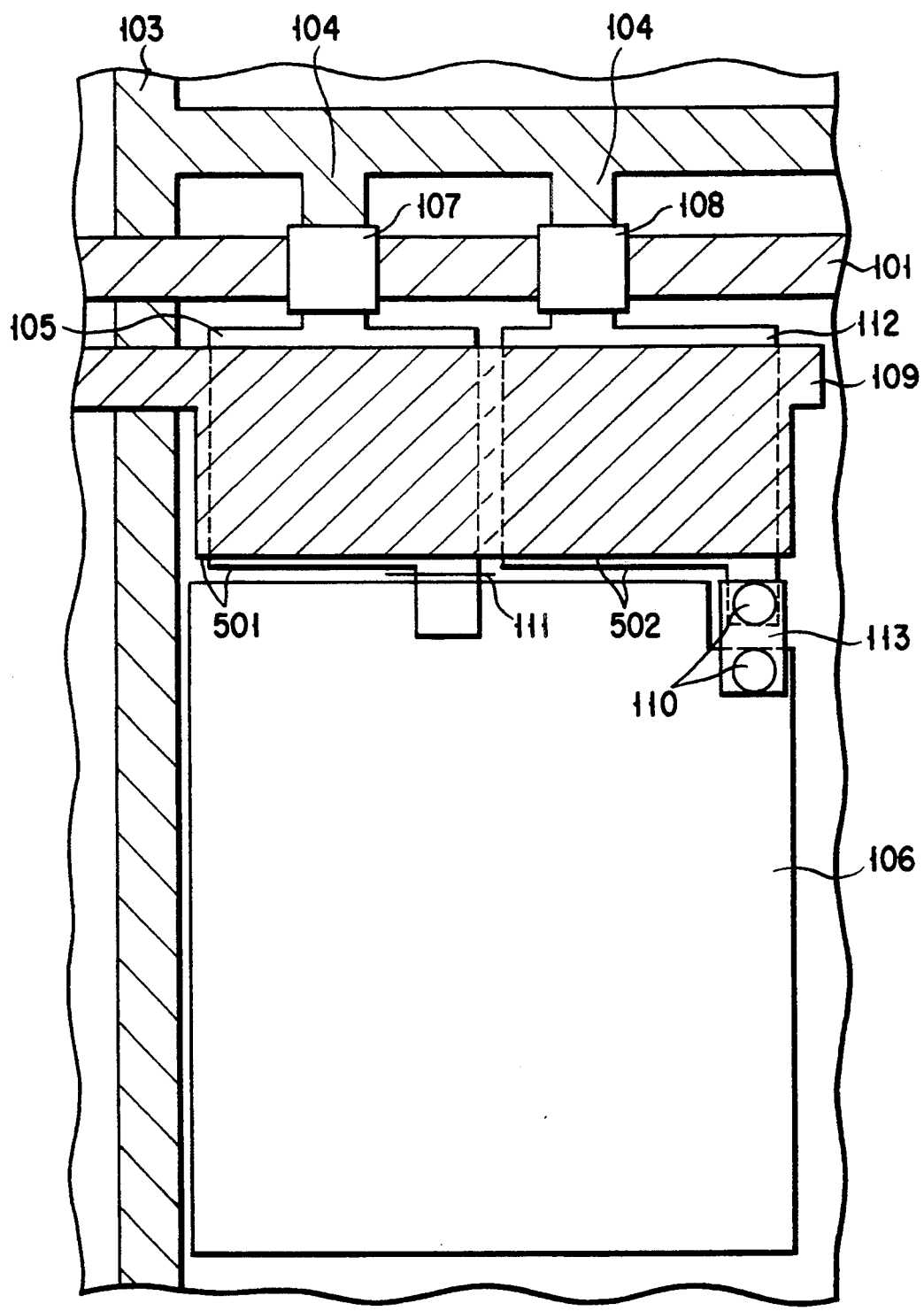
FIG. 15 is a schematic plan view showing the structure of the liquid crystal display element according to the fifth embodiment of the present invention.

FIG. 15 is a plan view showing how one pixel of a TFT array looks like when viewed from the substrate. In FIG. 15, the illustration of an interlayer insulating film is omitted.

Referring to FIG. 15, a scanning line 101 is connected to gate electrodes (not shown) of a first TFT 107 (i.e., a first switching element) and a second or auxiliary TFT 108 (i.e., an auxiliary switching element). The first TFT and the auxiliary TFT 108 are switched on or off, depending upon the potential at the scanning line 101. A signal line 103 is connected to a drain electrode 104. A source electrode 105 is connected to a pixel electrode 106, and the second conductive film 110 overlaps with the source electrode 112, with an insulating layer interposed between them. The second conductive film 113 can be electrically connected to the auxiliary TFT. The pixel electrode 106 also serves as a first conductive film. The second conductive films 113 overlaps with the pixel electrode 106, with an insulating layer interposed, and can be electrically connected to the pixel electrode 106. A wiring line 109 is connected to a common electrode, and its potential is maintained at a constant value. The wiring line 109 is arranged on the source electrode 112, with an insulating film interposed, such that a capacitor 502 is constituted thereby. The wiring line 109 maintains the potential at part of the source electrode 112 at a constant value. The wiring line 109 and the source electrode 105 jointly constitute a capacitor 501.

In the TFT array of the above structure, the first TFT is switched on when the signal line 103 and the scanning line 101 are applied with a signal voltage and a scanning voltage, respectively. As a result, a signal is supplied to the pixel electrode 106.

The first TFT 107 is connected to the pixel electrode 106, while the auxiliary TFT 108 (i.e., an auxiliary switching element) is electrically isolated from the pixel electrode 106 by means of the laser contact portions 110.

If the first TFT 107 is determined to be defective, the laser contact portions 110 are electrically connected together by laser beam irradiation. Further, by laser beam irradiation, the source electrode 105 of the first TFT 107 is cut at the portion indicated by 111 in FIG. 15. As a result, the auxiliary TFT 108 is electrically connected to the pixel electrode 106 and pixel electrode 106 is therefore repaired. Since it is not likely that the two TFTs will become defective simultaneously, a defective pixel element can be repaired almost 100%.

The wiring line 109 and the source electrode 105 connected to the first TFT constitute the capacitor 501 (i.e., the auxiliary capacitance), in cooperation with the insulating layer interposed therebetween. If the capacitor 501 has an interlayer insulation defect, the capacitor 501 is repaired in the same manner as mentioned above. To be specific, the auxiliary TFT 108 and the capacitor 502 are employed in place of the first TFT and the capacitor 501. Since it is not likely that the two capacitors 501 and 502 will become defective simultaneously, the defect of the auxiliary capacitor can be repaired almost 100%.

According to the fifth embodiment of the present invention, defects of two types (namely, a defect of a TFT and an interlayer insulation defect of an auxiliary capacitor) can be eliminated by repairing the same portion. Hence, the fifth embodiment can provide a redundant structure which is effective in repairing defects of a plurality of types.

FIG. 16 shows an equivalent circuit corresponding to the case where the liquid crystal element of the fifth embodiment is not repaired.

In the equivalent circuit shown in FIG. 15, reference numeral 401 denotes a parasitic capacitance between the gate and the source of the first TFT, 402 denotes a parasitic capacitance between the gate and the source of the auxiliary TFT, 403 denotes a parasitic capacitance of the laser contact portion located near the auxiliary TFT, 404 denotes a parasitic capacitance of the laser contact portion located near the pixel electrode, 405 denotes a liquid crystal capacitance, 406 denotes an accumulated capacitance, and 502 denotes a capacitor formed by both the wiring line 109 (FIG. 15) and part of the source electrode 112 (FIG. 15). Terminal A is connected to the scanning line, and terminals B and C are connected to the common electrode. Reference numeral 407 denotes a second conductive film 113 (FIG. 15), and 602 denotes that part of the source electrode 112 (FIG. 15) which is connected through the capacitor 502 to terminal C and which therefore has a constant potential.

The potential of part 602 of the source electrode is maintained at a constant value since part 602 is supplied with a charge from the capacitor 502. Therefore, even if a pulse wave such as that indicated in FIG. 16 is input from the scanning line, a potential variation corresponding to a punch-through voltage which arises from the parasitic capacitance 402 between the gate and source of the auxiliary TFT is not transmitted to the second conductive film 407, and the potential of the second conductive film 407 remains unchanged. In other words, parasitic capacitances 402 and 403 do not have any effect on the pixel electrode. Since the effect arising from the punch-through voltage is the same between a repaired pixel and an unrepaired pixel, a high-quality liquid crystal element having no irregular pixel arrangement on the screen can be manufactured with a good yield. According to an experiment conducted by the inventor, the value of the punch-through voltage dVp of the fifth embodiment is 1/6 that of the punch-through voltage of the prior art.

The present invention is applicable to so-called common electrode inversion wherein the potential of a common electrode is changed between scanning periods and the potential of an auxiliary capacitance line is changed in accordance with the change in the potential of the common electrode. Let it be assumed that terminal C in the equivalent circuits in FIGS. 14 and 16 is a common electrode. In this case, the graph shown in FIG. 17 is obtained wherein "Vg" is a gate voltage, "Vsig" is a signal voltage, "Vcs" is a voltage applied to the auxiliary capacitance line, "Vcom" is a common voltage, "Vpixel" is a potential of the pixel electrode, "$V_{LC}$" is a voltage (Vpixel - Vcom) obtained by subtracting the common voltage Vcom from the potential of the pixel electrode, and "dVp" is a shifting in the pixel potential (punch-through voltage) due to switching noise.

Voltage Vcs and common voltage Vcom are varied such that they are opposite in phase. With Voltage Vcs and common voltage Vcom being varied in this manner, voltage $V_{LC}$ can be high even if the amplitude of voltage is of a small value. Since a signal line driver IC can transmit a signal in the state of a small potential difference, the power consumption can be reduced.

Referring to FIG. 17, the shifting in the pixel potential due to switching noise becomes a problem when t=t1. At the time, the common voltage Vcom is kept constant. The switching noise causes a shift in the pixel potential when the potential of the scanning line varies (i.e., when a transistor is turned off and the gate voltage Vg varies). Therefore, the potential of the second conductive film 407 (FIGS. 14 and 16) is maintained at a constant value at least when the transistor is turned off. Hence, the effects arising from the parasitic capacitances of the auxiliary transistor and the laser contact portions can be suppressed.

The present invention is advantageous when it is applied to a liquid crystal display element using the common electrode inversion described above.

The concept of a redundant structure is not limited to TFTs; it can be applied to other structural elements. In any case, it is desirable that a redundant structure be provided for coping with a very likely defect. It should be also noted that the number of TFTs per pixel may be three or more. It is further noted that the present invention is applicable to not only TFTs but also laser contact portions. Still further, the switching elements are not limited to TFTs; the present invention is applicable to switching elements made by diodes or to other types of switching elements.

As described above, when the present invention is applied to an active matrix type liquid crystal display element wherein a plurality of switching elements are provided per pixel for coping with a defect of the switching elements, the effects arising from the parasitic capacitance of an auxiliary switching element and the parasitic capacitance of laser contact portions can be eliminated, and the display characteristics are not degraded after a defective switching element is repaired.

In addition to the above modifications, various types of modifications of the above embodiments can be made. For example, the arrangement of the auxiliary capacitor 13 is not limited to the above structure, but a stacked film with an amorphous silicon layer may be used instead of the insulator 24 only. The upper electrode 21 may be formed of the same material as that of the signal line 5 and connected to the picture element electrode 3. Although the auxiliary capacitor 13 is connected to the ground line 12 in each of the above embodiments, the capacitor 13 may be connected to the adjacent scanning line 4 as in a conventional structure. A diode may be used instead of the transistor as the active element of the above embodiments.

Although a liquid crystal display is exemplified as an application of the active matrix substrate, the present invention can be applied to another display, e.g., a plasma display or an EL (electroluminescence) device. In addition, the present invention can be practiced when it is applied to an input device such as a contact sensor.

Also, a manufacturing method of the present invention can be variously modified. That is, in the above embodiments, the cutting step and the connecting step of the transistor are performed at two out of three terminals of the transistor. However, these steps may be performed at the three terminals. Although the gate is connected in advance, it may be cut in advance. In the cutting and connecting steps, a laser trimming apparatus and a laser welder are used. However, cutting may be performed by etching, or laser CVD (chemical vapor deposition) may be used to form a film to perform the connecting step.

Furthermore, the order of cutting and connecting steps can be arbitrarily changed.

As has been described above, according to the present invention, a point defect of a liquid crystal display can be satisfactorily recovered. As a result, the yield is largely improved. Since no extra line need be formed, no other defects occur, and an aperture ratio is not reduced. In addition, recovery can be rapidly and easily performed. Furthermore, since a change in electrical characteristics can be minimized before and after recovery, an increase in capacitive load can be suppressed upon installation of a redundant circuit.

In particular, almost no increase is produced in particularly problematic signal delay even in a large substrate. Therefore, since specific performance of the display need not be sacrificed for recovery, the total cost performance of the display can be improved by improving the manufacturing yield and facilitating automatic restoration process.

Moreover, according to the present invention, even if a failure occurs or a bad portion is detected after a product is placed on the market, the bad portion can be rapidly and easily recovered without replacing the overall liquid crystal display. Therefore, a repair cost of a product can be largely reduced and a product life can be largely improved.

Additional advantages and modifications will readily occur to those skilled in the art. Therefore, the invention in its broader aspects is not limited to the specific details, and illustrated examples shown and described. Accordingly, various modifications may be made without departing from the spirit or scope of the general inventive concept as defined by the appended claims and their equivalents.

What is claimed is:

1. A liquid crystal display element, comprising:
   a substrate;
   a scanning line that is formed on the substrate;
   a pixel electrode that is formed on the substrate;
   a first thin film transistor that is formed on the substrate, the first thin film transistor having a gate electrode connected to the scanning line, a source that is connected to the pixel electrode, and a drain, said first thin film transistor being switched on and off in accordance with potential that is applied to the scanning line;
   a second thin film transistor, said second thin film transistor having a gate electrode that is connected to the scanning line, a source electrode that is for connection to the pixel electrode, and a drain that is connected to the drain of the first thin film transistor, said second thin film transistor having conduction from the source to the gate being switched on and off in accordance with potential that is applied to the scanning line;
   a conducting film that overlaps a portion of the source of the second thin film transistor and overlaps a portion of the pixel electrode;
   an insulating film that is disposed between the pixel electrode and the conducting film and also between the source electrode of the second thin film transistor and the conducting film and which insulates the conducting film from the pixel electrode and the source electrode;
   means for supplying a constant voltage to the conducting film;
   wherein the source of the second thin film transistor and the pixel electrode are conductively connectable via the conductive thin film by radiation of a laser beam onto the region of the conductive thin film that overlaps the source electrode and the region of the conductive thin film that overlaps the pixel electrode;
   wherein the source of the first thin film transistor may be conductively isolated from the pixel electrode via radiation of a laser beam onto a region that connects the source electrode of the first thin film transistor to the pixel electrode; and
   wherein the means for providing a constant voltage may be conductively isolated from the conductive thin film via radiation of a laser beam onto a region that connects the means for supplying a constant voltage to the conductive thin film.

* * * * *